(12) United States Patent
Encontre et al.

(10) Patent No.: US 10,162,602 B2
(45) Date of Patent: Dec. 25, 2018

(54) METHOD FOR HANDLING USER-LEVEL EVENTS FOR PROGRAMMING AN APPLICATION

(71) Applicant: INTUILAB, Labege (FR)

(72) Inventors: Vincent Encontre, Toulouse (FR); Nicolas Cunin, Toulouse (FR); Bruno Marchesson, Toulouse (FR)

(73) Assignee: INTUILAB, Labege (FR)

( * ) Notice: Subject to any disclaimer, the term of this patent is extended or adjusted under 35 U.S.C. 154(b) by 0 days.

(21) Appl. No.: 15/201,882

(22) Filed: Jul. 5, 2016

(65) Prior Publication Data

US 2017/0010868 A1 Jan. 12, 2017

(30) Foreign Application Priority Data

Jul. 6, 2015 (EP) .................................. 15306103

(51) Int. Cl.
| | | |
|---|---|---|
| *G06F 9/44* | (2018.01) | |
| *G06F 8/30* | (2018.01) | |
| *G06F 8/36* | (2018.01) | |
| *G06F 3/0488* | (2013.01) | |
| *G06F 3/0484* | (2013.01) | |
| *G06F 9/54* | (2006.01) | |
| *G06F 9/46* | (2006.01) | |

(52) U.S. Cl.
CPC .............. *G06F 8/30* (2013.01); *G06F 3/0484* (2013.01); *G06F 3/0488* (2013.01); *G06F 8/36* (2013.01); *G06F 9/46* (2013.01); *G06F 9/542* (2013.01)

(58) Field of Classification Search
CPC ....................................................... G06F 8/30
USPC ................................ 717/101–109, 120–121
See application file for complete search history.

(56) References Cited

U.S. PATENT DOCUMENTS

| | | | | |
|---|---|---|---|---|
| 6,035,343 A | * | 3/2000 | Tsushima | G06F 8/20 719/318 |
| 6,681,383 B1 | * | 1/2004 | Pastor | G06F 8/30 717/126 |
| 6,912,719 B2 | * | 6/2005 | Elderon | G06F 9/541 707/E17.032 |
| 7,823,123 B2 | * | 10/2010 | Sabbouh | G06F 17/30893 717/106 |

(Continued)

FOREIGN PATENT DOCUMENTS

WO 01/98936 A2 12/2001

OTHER PUBLICATIONS

Jayaram et al, "Context-Oriented Programming with EventJava", ACM, pp. 1-6, 2009.*

(Continued)

*Primary Examiner* — Anil Khatri
(74) *Attorney, Agent, or Firm* — Meagher Emanuel Laks Goldberg & Liao, LLP

(57) ABSTRACT

The invention relates to methods for handling user-level events for programming an application. The methods aim at providing the designer of an application the ability to use easily understandable user-level events rather than low-level, often platform dependant input events, whose use generally requires important programming skills. It also aims at optimizing the generation of user-level events, by improving the detection of events and detecting only a subset of possible user-level events depending on the context of the application.

16 Claims, 11 Drawing Sheets

(56) References Cited

U.S. PATENT DOCUMENTS

| | | | | |
|---|---|---|---|---|
| 7,979,390 | B2* | 7/2011 | Chellappa | G06F 17/30584 707/618 |
| 8,195,803 | B2* | 6/2012 | Zhang | G06F 8/00 370/351 |
| 8,522,196 | B1* | 8/2013 | Kim | G06F 11/3664 717/100 |
| 8,527,939 | B2* | 9/2013 | Elad | G06F 9/453 717/105 |
| 8,589,949 | B2* | 11/2013 | Biazetti | G06F 9/541 709/223 |
| 8,631,386 | B2* | 1/2014 | Doshi | G06F 8/315 717/106 |
| 8,666,764 | B2* | 3/2014 | Ciszkowski | 705/2 |
| 8,782,598 | B2* | 7/2014 | Chaar | G06F 8/00 717/106 |
| 8,910,113 | B2* | 12/2014 | Srinivasaraghavan | G06F 8/34 717/106 |
| 9,317,255 | B2* | 4/2016 | Meijer | G06F 8/30 |
| 9,369,673 | B2* | 6/2016 | Ma | H04N 7/152 |
| 2007/0255529 | A1 | 11/2007 | Biazetti et al. | |

OTHER PUBLICATIONS

Gasiunas et al, "EScala: Modular Event-Driven Object Interactions in Scala", ACM, pp. 227-240, 2011.*

Schluter et al, "Modeling and Analysis of Software Development Management as Closed Loop Control". IEEE, pp. 210-214 (Year: 2012).*

Yao et al, "On-demand Software Management in Sensor Networks using Profiling Techniques", ACM, pp. 133-115, 2006 (Year: 2006).*

McAllister et al, "Toward Effective Management of Large-Scale Software", ACM, pp. 16-22, 2016 (Year: 2016).*

Reichgelt et al, "Software Management as an Information Technology Knowledge Area", ACM, pp. 31-36, 2003 (Year: 2003).*

Partial European Search Report for 15306103.1, dated Mar. 2, 2016.

* cited by examiner

METHOD FOR HANDLING USER-LEVEL EVENTS FOR PROGRAMMING AN APPLICATION

FIELD OF THE INVENTION

The present invention relates to the handling of events for programming an application. More specifically, it relates to the definition and use of user-level events that are easier to manage than low-level input events.

BACKGROUND PRIOR ART

The management of events is a field of major importance in computing science. An event engine and system are used when some asynchronous external activity needs to be handled by a program or an application. For example, if a program needs to react when the user presses a mouse, an event "mouse pressed" can be created. Also, when a machine sends a message/event to the computer through a network, it can be processed as an event by the computer. In typical event engines, an event is fired when it occurs in a system. Once the event has been fired, handler functions can be implemented for listening to the event, and adapt the behavior of the program according to the event.

An event can contain parameters that are linked to the event type. For example, a mouse event may embed x,y parameters that represent the position on the screen where the user has clicked on the mouse. These parameters can be retrieved by the handler function, in order to further adapt the behavior of the program. For example, the position where the user clicked on the mouse can be used to find a button under the position, and trigger a click on this button.

The use of events is very common in programming languages such as C, C++, or Java. In common event engines, the events are fired by the system, and a developer can develop handler functions that derive from a generic handler function. This method allows a great flexibility for managing events, because any behavior can be defined in the handler function. In this case events are usually relatively low level events that depend directly on the platform and execution language. Such events are the events directly detectable by a machine with the associated parameters. Such events may be for example:

A "finger press" event associated with x,y coordinates when the finger of a user presses the screen of a touch device at the x,y position;

A "finger released" event associated with x,y coordinates when the finger of a user releases its finger from the screen of a touch device at the x,y position;

A "click" event associated with x,y coordinates when a user clicks on the mouse when the pointer is in the position at the x,y coordinates;

An "orientation" event, associated with an angle around an axis when the gyro of a device detects an orientation around this axis;

More generally, device sensor events such as GPS event with a geo position, accelerator events, etc. . . .

A "time tick" event, associated with a time, at ticks of a clock;

Etc. . . .

These events are usually defined for one environment. For example a "Finger press" event may exist in Java for being executed by a Java Virtual Machine, a "Finger press" event exists natively for programming iPads, Windows Phones, etc. . . . The events on each environment of execution have their own definition: a "Finger press" event will have a different name, if not different parameters, when programming in each execution environment.

Thus, such event handling methods are very hard, if not impossible, to use by non-developers. Indeed a man without skills in development and computing science engineering will hardly understand the meaning of a low-level or native event in each execution environment and be able to develop the associated handler functions.

Meanwhile, the designer of an interactive application will usually be interested in higher-level events. For example, the designer of an interactive application is interested in handling high-level event directly understandable as a natural behavior by the user of the interactive application. For example, the designer may be interested in handling events such as "double-tap" when a user taps rapidly twice a same area of a tactile surface. For handling such events using a traditional approach, one must detect successive events such as "finger pressed" and "finger released", detect that these events occurred in a same area and close in time. This requires complex programming skills which are not always accessible to designers focused on building functional interactive applications.

The present application aims at making the design of interactive applications easier, notably by allowing a designer without skills in software development to manipulate a wider variety of events easily understandable at the designer level.

SUMMARY OF THE INVENTION

To this effect, the invention discloses a method for generating a collection of user-level events for programming an application, said method comprising: listing sequences of input events from at least two different channels, each input event being defined by at least a bit pattern; defining, for at least a sequence of input events, a transformation of said at least a sequence of input events into a user-level event, each user-level event generating an input to the application; associating, to each input to the application, the corresponding user-level event.

The invention also discloses a method for using a collection of user-level events for programming an application, said method comprising, for each application event to be entered in the application: retrieving from the collection of user-level events, a corresponding user-level event and a transformation of at least a sequence of input events of two different channels into the corresponding user-level event; obtaining an executable form of the transformation; linking said executable form of the transformation to the application; configuring at least one of the application and an environment of the application for sending to the transformation series of bit patterns, as sequences of input events expected as input to the transformation.

Advantageously, input events are raw input events.

Advantageously, input events are in normalized form, and the method further comprises converting at least one raw input event in an event in normalized form.

The invention also discloses a computer program, stored on a non-transitory medium, comprising computer code instructions for causing a processor to execute the steps of a method disclosed above.

The invention also discloses a method for filtering a collection of user-level events, said collection comprising for each user-level event, a corresponding input to an application, a sequence of input events and a corresponding transformation for transforming said sequence of input events into the user-level event, said method comprising:

retrieving from the collection a user-level event; analyzing the application to determine contextual parameters of calls of the user-level event in the application; associating said contextual parameters of the calls of at least the user-level event to the corresponding transformation.

The application also discloses a method for using a collection of user-level events, said method comprising for each application event to be entered in a computer application: retrieving from the collection of user-level events, a corresponding user-level event and a transformation of a sequence of input events into the corresponding user-level event, said transformation having associated therewith contextual parameters of the calls of the user-level event to the corresponding transformation; obtaining an executable form of the transformation, whenever the contextual parameters of said transformation define that said transformation should be called; configuring at least one of the application and an environment of the application for sending, to the transformation, a series of bit patterns as sequences of input events expected as inputs to the transformation.

The invention also discloses a device equipped with processing capability configured to execute one of the methods according to the invention.

The invention also discloses an application, stored on a non-transitory medium, comprising code instructions for causing a processor to execute the method of the invention.

The invention also discloses a device for executing an application, comprising: at least two different channels of input events; a communication channel to a server; a processing capability configured for: retrieving a context of the application; sending the context of the application to the server through the communication channel; receiving from the server a transformation of a sequence of input events into a corresponding user-level event; obtaining an executable form of the transformation; configuring at least one of the computer application and an environment of the computer application for sending, to the transformation, series of bit patterns as sequences of input events expected as inputs to the transformation.

The methods of the invention permit designers of applications without programming skills to manage user-level events.

In a number of embodiments, the methods of the invention allow the use of events that are not dependant of a platform or an operating system.

The methods of the invention ease the development of interactive applications.

In a number of embodiments, the methods of the invention diminish the CPU usage for generating user-level events and render the execution of an interactive application more reactive.

In a number of embodiments, the methods of the invention permit the end user of an interactive device to enjoy more reactive applications with a longest battery life.

The methods of the invention render the conditions of generation of user-level events easier to manage, more cost-effective and more adapted to prototyping.

BRIEF DESCRIPTION OF THE DRAWINGS

The invention will be better understood and its various features and advantages will emerge from the following description of a number of exemplary embodiments and its appended figures in which.

DETAILED DESCRIPTION OF THE INVENTION

In this specification, the invention will be described by way of examples relative to the definition of events for an interactive device, and usage of said events on an interactive device. However, it should be noted that the invention may be used in any event-driven environment, for example in a multi-device environment.

Figure 1:
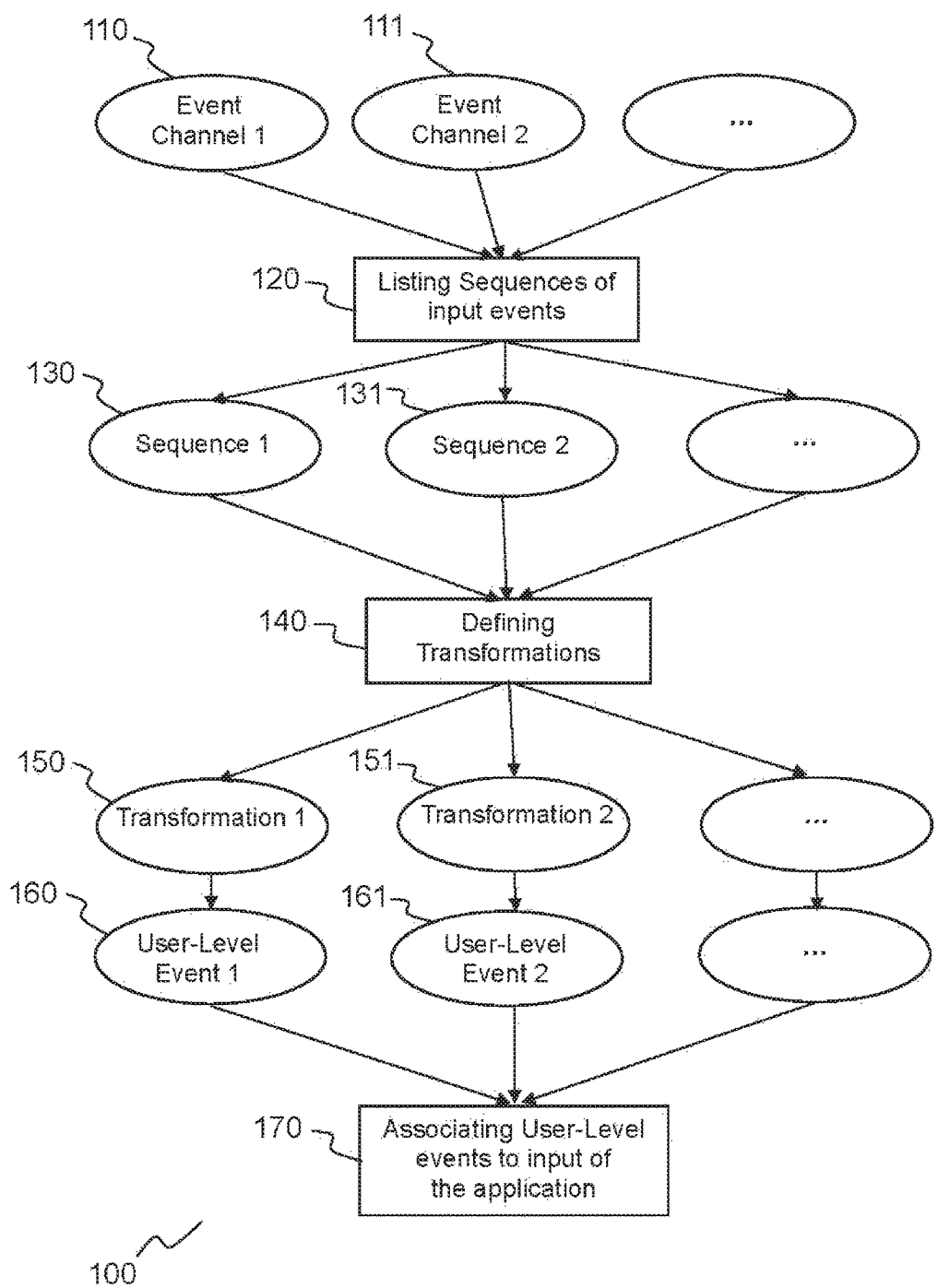
FIG. 1 displays a flow diagram of a method for generating a collection of user-level events for programming an application.

FIG. 1 displays a flow diagram of a method 100 for generating a collection of user-level events 160, 161 for programming an application according to the invention.

By way of non-limitative example, the method is used for programming an application for an interactive device. A method according to the invention comprises listing sequences of input events from at least two different channels 110, 111. The two different channels may refer to events of different types, for example a tap and a click event, or events of the same type that are received using two different logical or physical modalities. For example, a tap event may be received after having been fired locally on the interactive device, or received through a communication link with a second device.

Channels of events may include for example:
Machine events, that result of a sensor input on the interactive device, for example:
A Click on a mouse;
A press of a keyboard button;
A release of a keyboard button;
A tick of a clock;
An event representative of the orientation of the device from a gyro;
The touch of a tactile surface;
The pressure of a touch;
A value of battery charge;
A value of memory available;
A value of device temperature;
Device-facing motion detection using a webcam;
Events occurring or generated on another device, received through a communication link;
Weather information at device location;
Availability of an information (notification);

Event from another application on the device;
Events of an Operating System of the device:
  The start of an application;
  The establishment/stop of a Wi-Fi, 3G or Bluetooth connection.

The bit pattern of an event is its representation in memory that permits to retrieve and decode the event. The bits representative of an event usually comprise bits that define the event type. For a number of events, they also comprise bits representative of parameters of the event. For example a gyro event may comprise bits representative of the orientation of the device; a mouse press event may comprise parameters representative of the time and/or duration of the press; a tactile touch event may comprise parameters representative of position in the tactile surface on which the touch occurred.

Events therefore occur in very different channels and forms, and it is very difficult for the designer of an application to efficiently handle them. On the contrary, user-level events are events easily understandable and usable by the designer of an application. User-level events usually refer to an intuitive behavior that does not correspond to an input event on a machine, and comprise for example:
  A "double tap" event when the user taps twice in a short time in the same area of a tactile surface;
  A "horizontal-vertical flip" event when a device evolves from an horizontal to a vertical position;
  A "swipe" event when the finger of the user translates on a tactile surface in a near-straight line;
  Any single- or multi-touch gesture;
  Human (including gender) detection from device-facing motion detection;
  Etc.

The method 100 further comprises a step 120 of listing sequences 130, 131 of input events. Specific sequences of input events may be representative of a user-level event. Sequences of events comprise at least two events of the same or different types, for example:
  Two successive tap events;
  Two successive gyro orientation events;
  A plurality of tactile surface touch events;
  Etc.

A sequence can for example be defined for each possible user-level event. The method further comprises a step 140 of defining, for at least a sequence of input events, a transformation 150, 151 of said at least a sequence of input events into at least a user-level event, each user-level event generating an input to the computer application. The transformations of sequences of events into a user-level event define rules for generating a user-level event at the occurrence of the sequence. These rules may comprise parameters. For example the following transformations may be defined:
  At the occurrence of two tap events, generate a "double tap" event if the duration between the two tap events is below a threshold, for example 250 ms;
  At the occurrence of two successive gyro orientation events, generate a "horizontal-vertical flip" events if the first event indicates an orientation below 45°, and the second an orientation above 45°;
  At the occurrence of a plurality of tactile surface touch events, generate a swipe event if at least 5 successive tactile touch events indicate a displacement of the finger of the user in a straight direction;
  At the occurrence of tactile touch events, generate "multi-finger swipe" events if a progressive, parallel and simultaneous displacement of at least 4 fingers is detected;
  At the occurrence of tactile touch events, generate "closing object" events if a progressive and simultaneous displacement of at least 4 fingers from points near the border of a virtual circle from a central point is identified;
  Etc. . . .

The method 100 further comprises a step 170 of associating, to each input of the application, the corresponding user-level event.

This allows the designer of an application to use user-level events such as "double tap" or "horizontal-vertical flip" as input of the application.

In a number of embodiments of the invention, input events are raw input events. Raw input events are tied to a particular machine, platform or implementation. For example a raw input event may be the "click" event of the Windows platform, the "tap" event of a given device, etc. . . . These embodiments are advantageous, since they permit use directly all the events available on a platform.

In other embodiments of the invention, input events are events in a normalized form. An event in a normalized form is an event independent of a platform, device or implementation. Normalization of events can be achieved when input events of at least one type are converted from raw, platform-specific to normalized events. Since raw and normalized events may have different bit patterns and parameter, this conversion may comprise converting the parameters of an event. For example, a "click" event on a platform may have a vertical and horizontal number of pixels in parameters, which represent the position of a click in a screen, while a normalized click event may use a relative horizontal and vertical position as parameter. A conversion of a number of pixels to a relative horizontal and vertical position of the click on the screen is therefore necessary to perform the conversion.

The method 100 according to the invention permits the designer of an application to use user-level events as input, while controlling the rules of transformation and sequences of input events that trigger the generation of each user-level input event.

Figure 2:
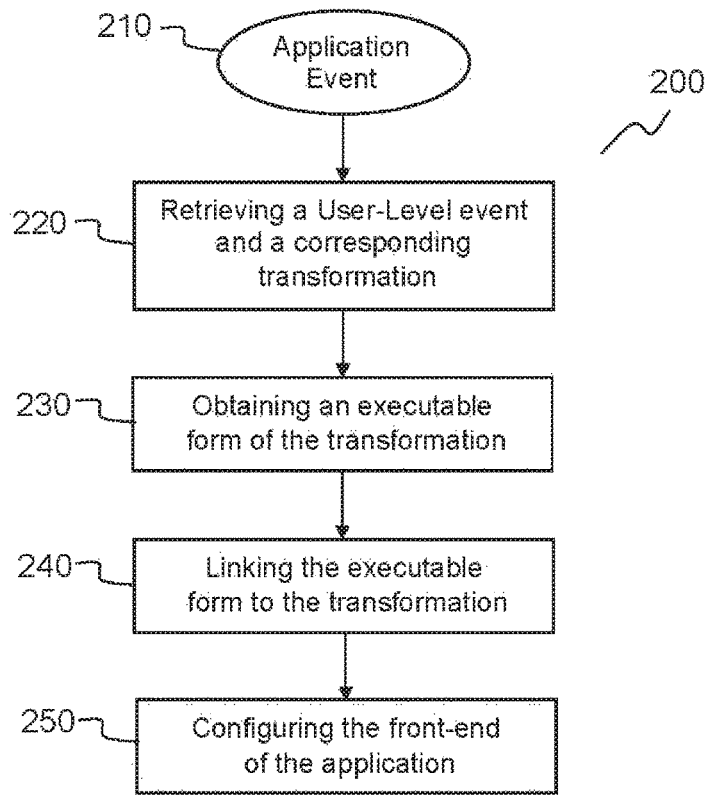
FIG. 2 displays a flow diagram of a method for using a collection of user-level events for programming an application in a number of embodiments of the invention.

FIG. 2 displays a flow diagram of a method 200 for using a collection of user-level events for programming an application in a number of embodiments of the invention.

The method 200 applies to each application event 210 to be entered in the application. An application event is an event that is both generated and used as input of an application.

The method 200 comprises a step 220 of retrieving from the collection of user-level events, a corresponding user-level event and a transformation of at least a sequence of input events of two different channels into the corresponding user-level event. The corresponding user-level event is a user-level event that is representative, in the context of the application, of an application event. For example, a double-tap or a swipe may represent an input in a given context of an application.

The method further comprises a step 230 of obtaining an executable form of the transformation. An executable form of the transformation may be obtained for example by compiling instructions corresponding to the transformation for a target machine or platform. In another embodiment of the invention, executable forms of the transformation already existing in libraries, and obtaining an executable form of the transformation consists in identifying the location of the executable form.

The method further comprises a step 240 of linking said executable form of the transformation to the application.

Linking the executable form of the transformation to the application may comprise packaging the executable code of the transformation within the application or within a library delivered with the application. It may also comprise ensuring that the executable code of the transformation is properly called by the application.

The method further comprises a step 250 of configuring at least one of the applications and an environment of execution of the application for sending sequences of bit patterns, as sequences of input events expected as input to the transformation. In a number of embodiments of the invention, this step consists in configuring the application for generating a bit pattern representative of the sequence of events to the transformation. In other embodiments of the invention, this step consists in configuring an environment of execution of the application for generating a bit pattern representative of the sequence of events to the transformation. According to various embodiments of the invention an environment of execution of the application may be for example an Operating System, a web browser or a Virtual Machine. The executable form of the transformation is then able to extract the parameters of the events, if any, and generate the relevant user-level event.

Similarly to the method 100, in a number of embodiments of the method 200 input events are raw input events, while in other embodiments of the method 200 input events are in normalized form.

Figure 3:
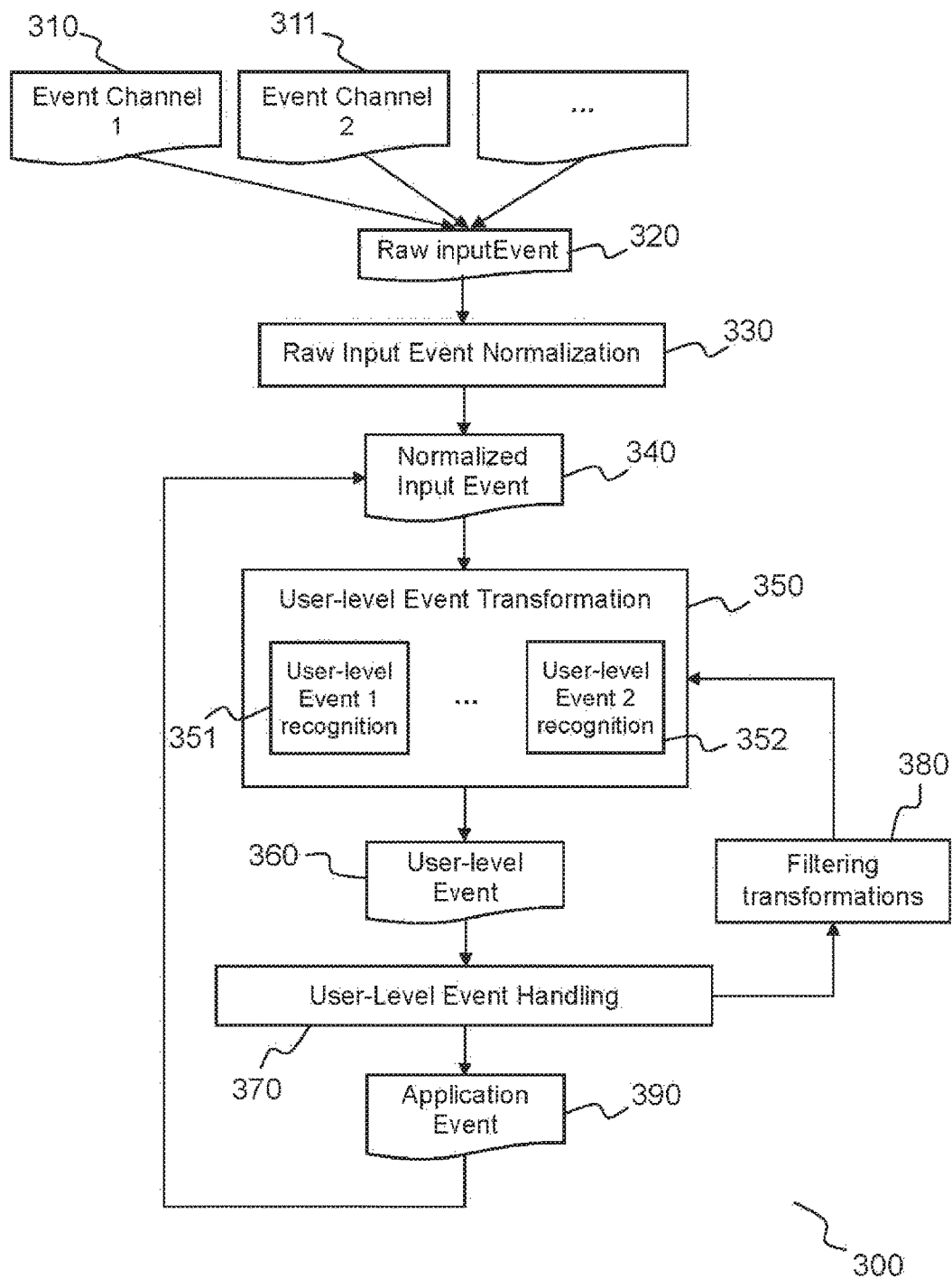
FIG. 3 displays a functional architecture for executing an application in a number of embodiments of the invention.

FIG. 3 displays a functional architecture 300 for executing an application in a number of embodiments of the invention. The functional architecture 300 is a non limitative example of a possible functional architecture for executing an application in a number of embodiments of the invention.

The modules displayed in FIG. 3 are functional modules. They may for example be implemented as hardware or software modules, within the application itself, a player, a web browser or an operating system. More specifically, FIGS. 4a to 4f provides examples of repartitions of the modules amongst an interactive device.

Raw input events 320 are received through a plurality of event channels 310, 311. The architecture 300 comprises a module 330 for converting raw input events into normalized input events 340.

The architecture 300 further comprises a module 350 for applying a plurality of rules of transformation 351, 352 of sequences of input events into user level events 360. The module 350 fires a user-level event each time that the corresponding sequence of input events is detected, if the conditions of transformation are met.

In other embodiments of the invention, the rules of transformation applies on sequences of raw input events, and the functional architecture for executing an applications does not comprise module 330 for normalizing raw input events.

The architecture further comprises a module 370 for handling user-level events. User-level events may be used by designers for modifying the behavior, state and/or context of an application. For example, a user-level event of the type "horizontal-vertical flip" may change a value of orientation in a context of the application. It may also cause a change of orientation of the layout of the application, a modification of the position and orientation of buttons and menus, etc. . . .

The module 370 can fire application events 390, which can in turn serve as normalized input events to the applications. It can also communicate changes in the context of the application to a module of optimization of event handling 380. The module of optimization of event handling is designed for identifying the user-level events that may serve as input for the execution of the application, in order to activate or deactivate the transformations 351, 352 in the module 350.

For example, if the application has no chance of receiving an event "double tap" in its actual context, the corresponding transformation can be deactivated. The functions of waiting events being computing-intense, this permits to save computational load and/or battery by limiting the event transformation active to those which are useful. Moreover, it may in certain cases render the application more reactive. For example, the rule of transformation of the event "double tap" generates a "double tap" event when two tap input event occurs in a close location in less than 250 ms, the deactivation of the rule of transformation of the event "double tap" permits to generate a single tap as soon as a "tap" raw input event occurs, without the need to wait 250 ms to discriminate between a tap and a double tap.

FIGS. 4a to 4f display 6 different functional architectures for executing an application in a number of embodiments of the invention.

Figure 4A:
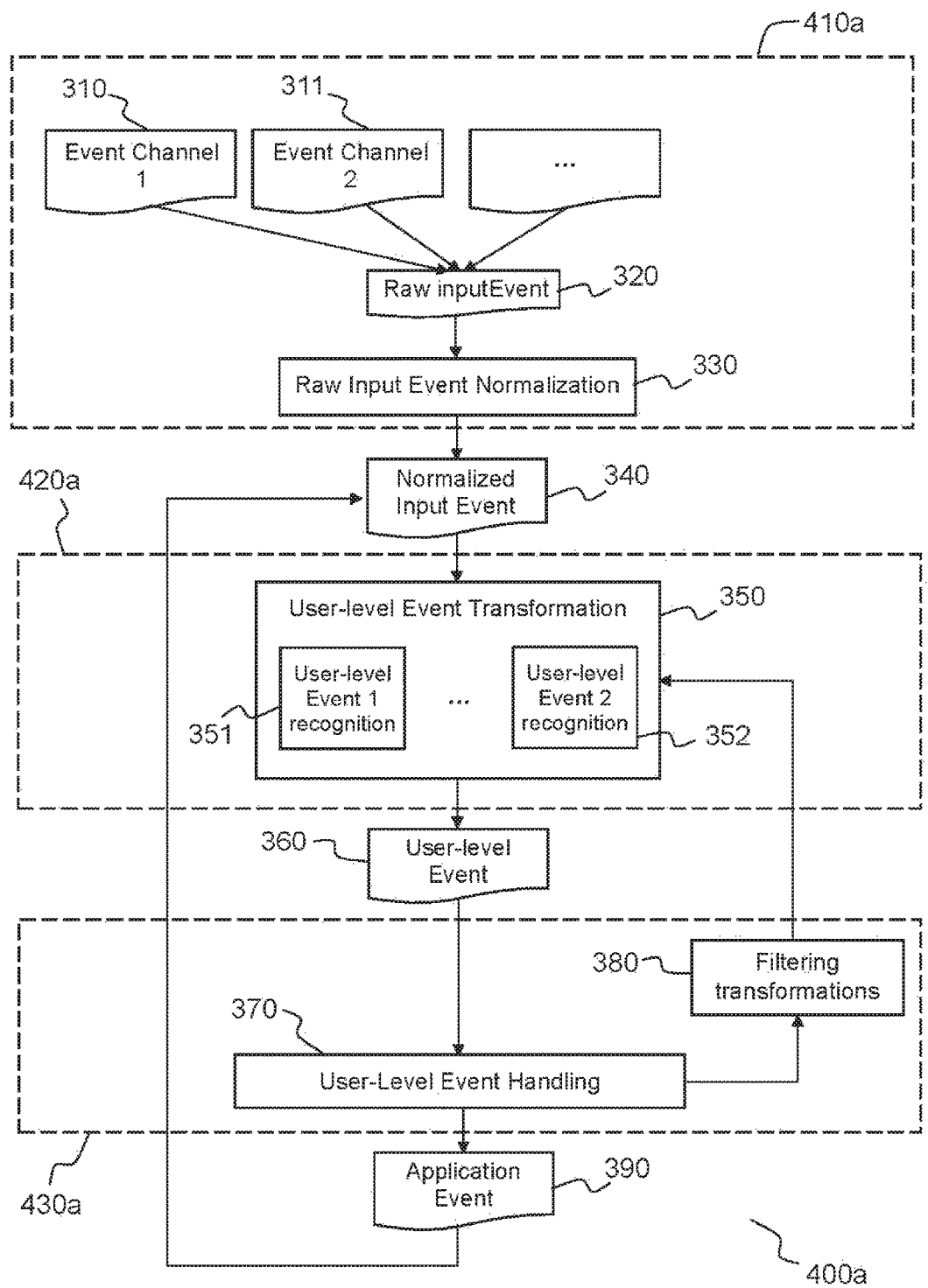
FIGS. 4a to 4f display 6 different functional architectures for executing an application in a number of embodiments of the invention.

FIG. 4a displays a first functional architecture 400a for executing an application in a number of embodiments of the invention. The architecture 400a comprises the functional modules of the architecture 300. In the architecture 400a the raw input event normalization module 330 is a hardware module of the device 410a on which the application is executed. The module 350 of user-level event transformation is a software module of the OS 420a of the device, and modules 370 and 380 of event handling and event detection optimization are software modules of the application 430a.

This embodiment allows the creation of shared rules of detection of user-level events at OS-level, user-level events becoming more easily usable by a plurality of applications. Meanwhile, the optimization of event detection in the application itself permits a better access to the context of the application in order to identify the events that may have an impact on the behavior of the application.

Figure 4B:
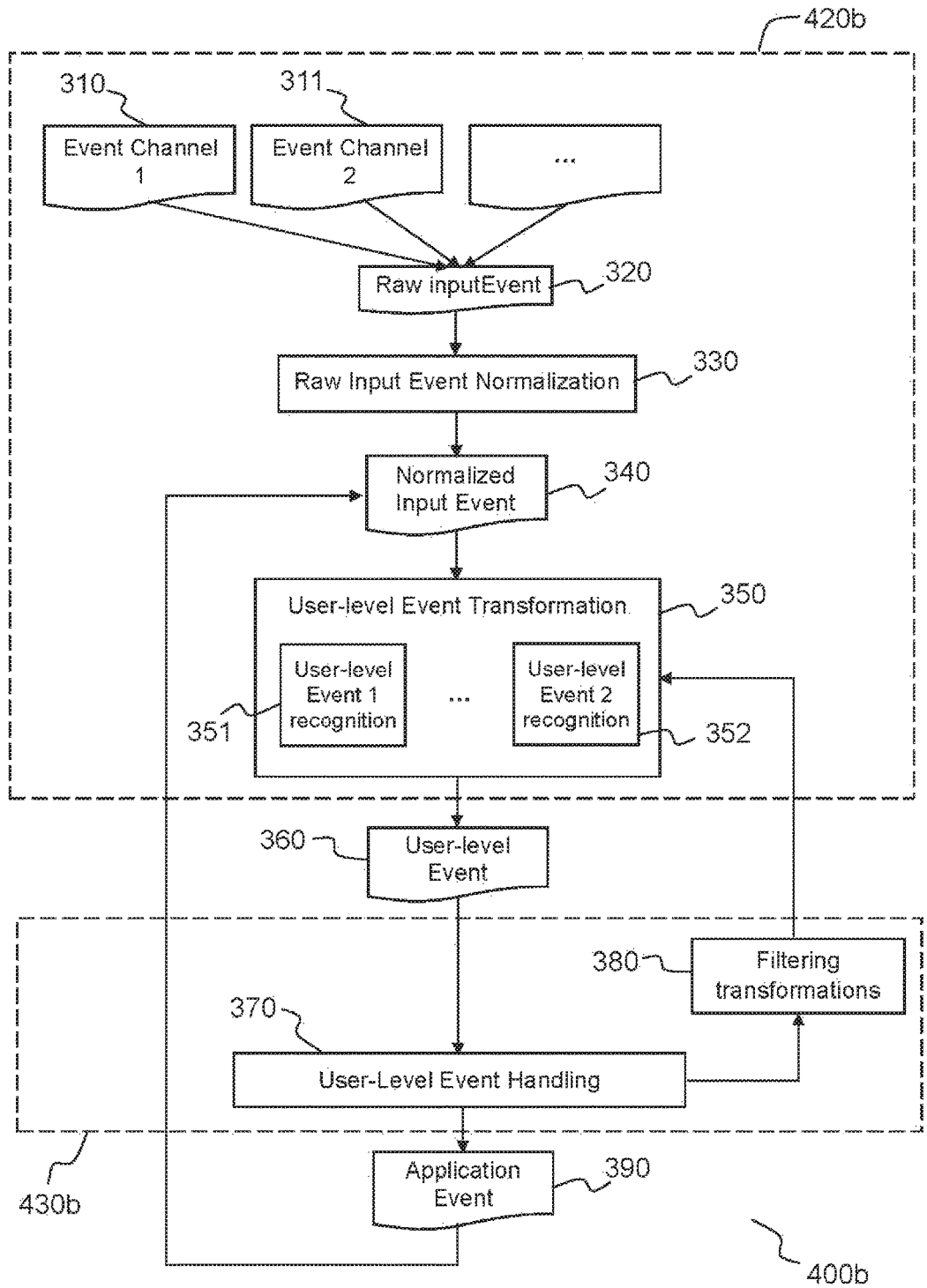

FIG. 4b displays a second functional architecture 400b for executing an application in a number of embodiments of the invention. The architecture 400b comprises the functional modules of the architecture 300. In the architecture 400b the raw input event normalization module 330 and the module 350 of user-level event transformation are software modules of the OS 420b of the device, and modules 370 and 380 of event handling and event detection optimization are software modules of the application 430b.

This embodiment allows the use OS-level normalized events and have shared rules of detection of user-level events at OS-level, user-level events becoming more easily usable by a plurality of applications. Meanwhile, the optimization of event detection in the application itself permits a better access to the context of the application in order to identify the events that may have an impact on the behavior of the application.

Figure 4C:
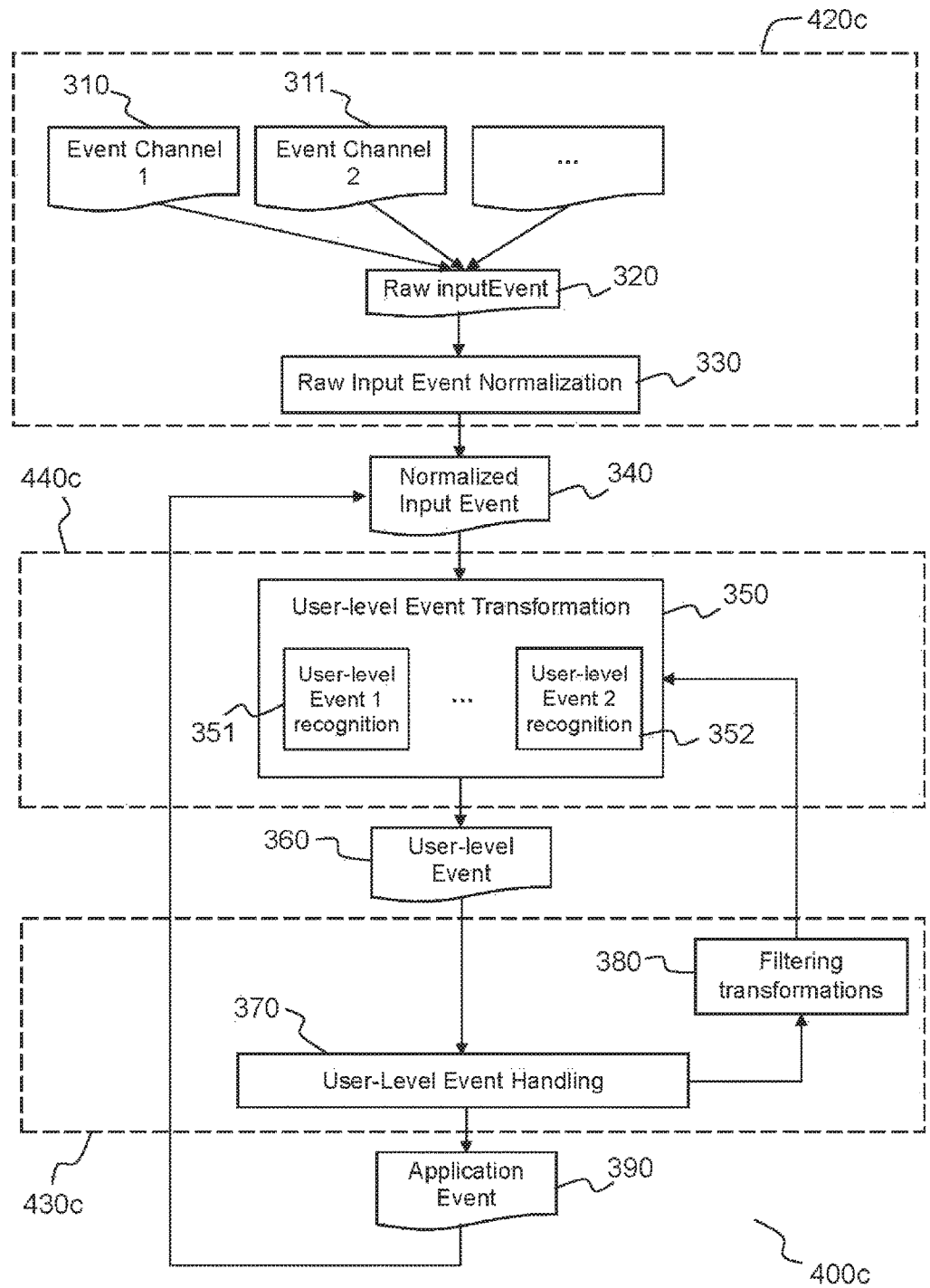

FIG. 4c displays a third functional architecture 400c for executing an application in a number of embodiments of the invention. The architecture 400c comprises the functional modules of the architecture 300. In the architecture 400c the raw input event normalization is a software module of the OS 420c of the device, the module 350 of user-level event transformation is a software module of a web browser 440c of the device, and modules 370 and 380 of event handling and event detection optimization are software modules of the application 430c.

In this embodiment the application 430c is for example an extension of the web browser. It may also be a script playable on the web browser. This embodiment advantageously permits to use easily user-level events generated by a web browser within applications or scripts playable by the web browser. Meanwhile, the application or script is able to provide to the web browser information about the user-level events that it may use in order that the web browser optimizes user-level event detection.

Figure 4D:
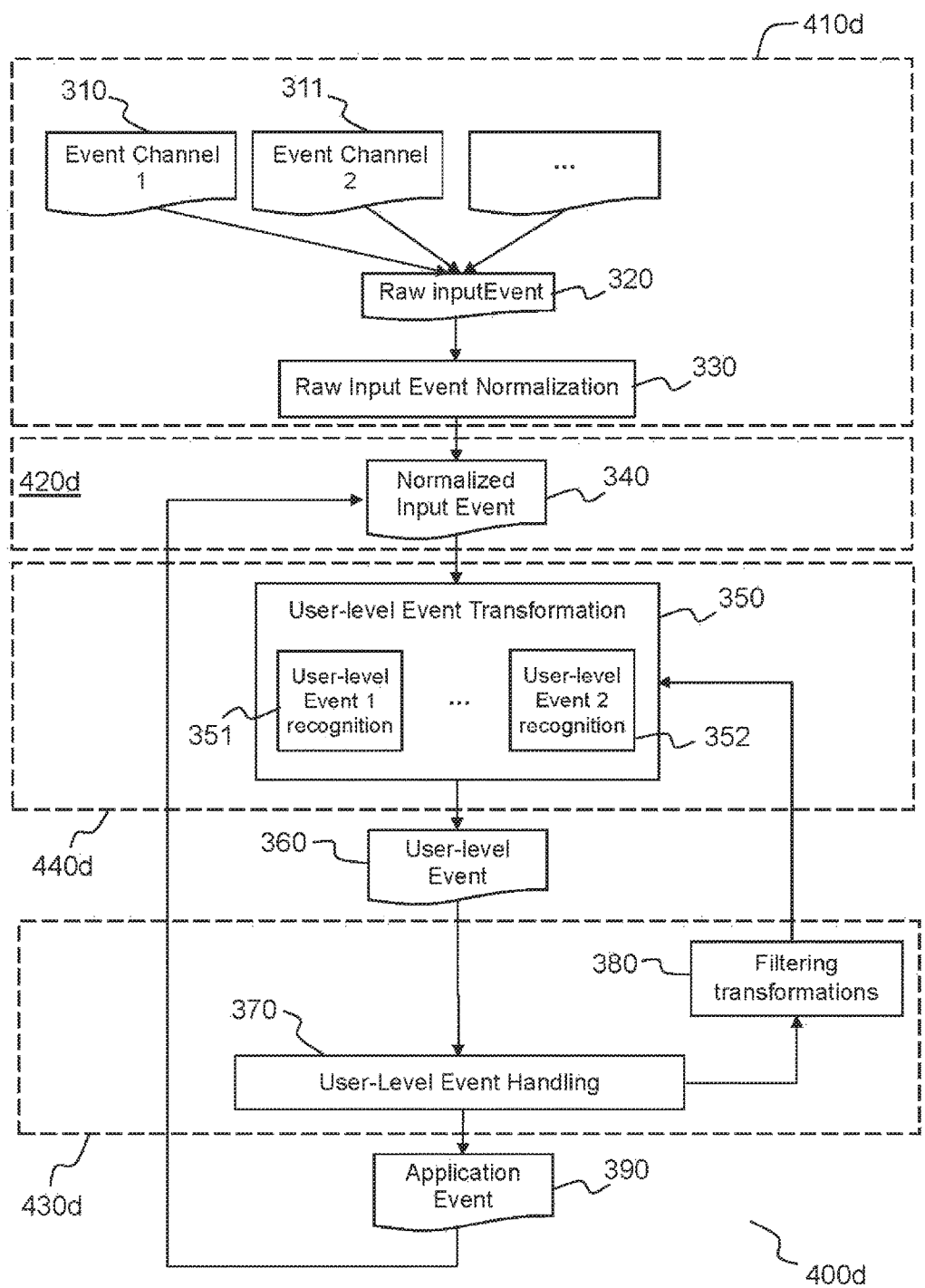

FIG. 4d displays a fourth functional architecture 400d for executing an application in a number of embodiments of the invention. The architecture 400d comprises the functional modules of the architecture 300. In the architecture 400d the raw input event normalization is a hardware module of device 410d, the module 350 of user-level event transformation is a software module of a web browser 440d of the device, and modules 370 and 380 of event handling and event detection optimization are software modules of the application 430d. The normalized input events are defined in the OS 420d. The hardware module of event normalization 330 converts input events from physical channels 310, 311 into events 340 normalized at OS level.

In this embodiment the application 430d is for example an extension of the web browser. It may also be a script playable on the web browser. This embodiment advantageously permits to use easily user-level events generated by a web browser within applications or scripts playable by the web browser. Meanwhile, the application or script is able to provide to the web browser information about the user-level events that it may use in order that the web browser optimizes user-level event detection. The normalization of the input events at OS level permits to develop web browser that generate user-level events more easily.

Figure 4E:
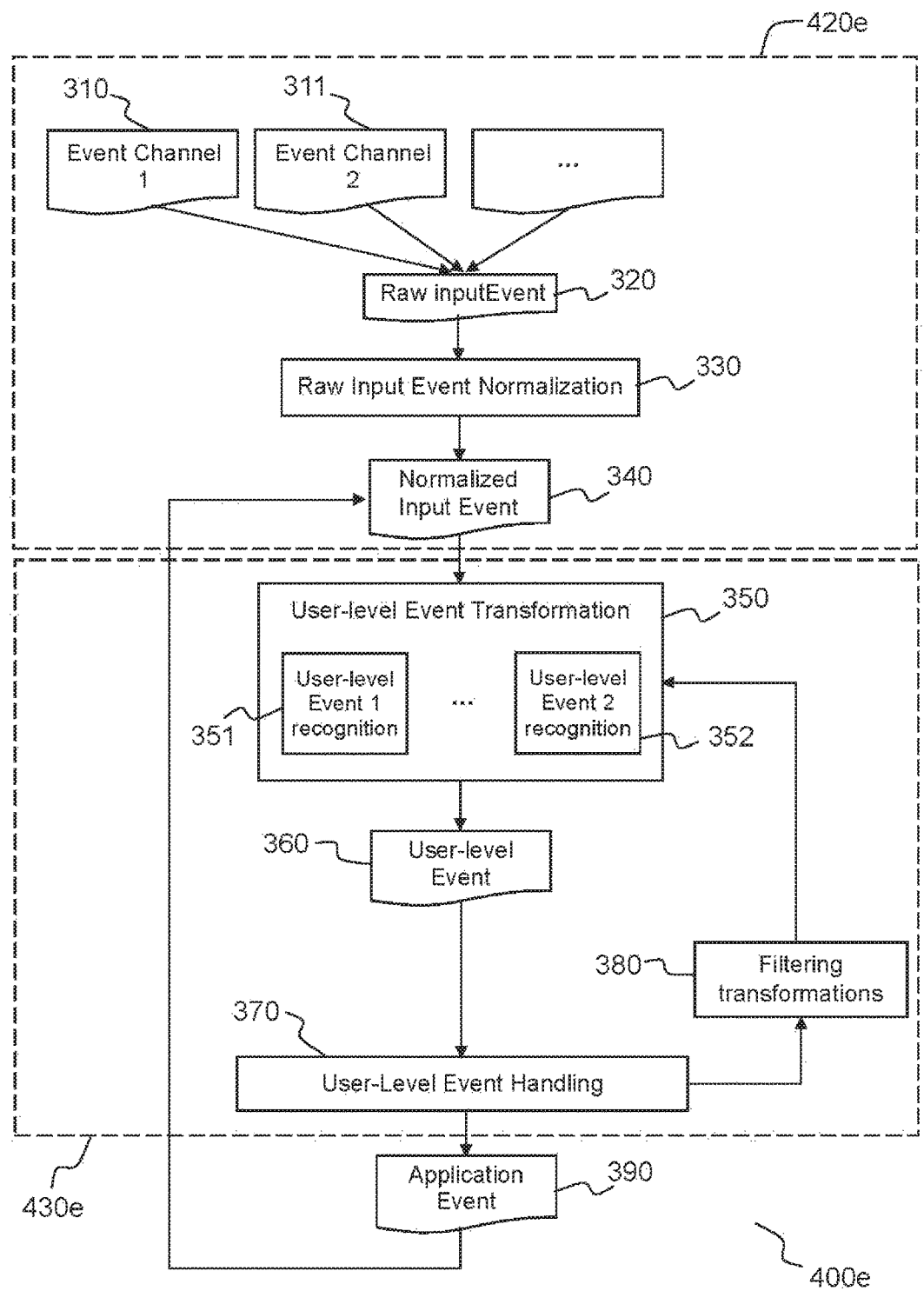

FIG. 4e displays a fifth functional architecture 400e for executing an application in a number of embodiments of the invention. The architecture 400e comprises the functional modules of the architecture 300. In the architecture 400e the raw input event normalization module 330 is a software module of the OS 420e of the device, the module 350 of user-level event transformation, and modules 370 and 380 of event handling and event detection optimization are software modules of the application 430e. The normalized input events are defined in the OS 420e. The software module of event normalization 330 converts input events from physical channels 310, 311 into events 340 normalized at OS level.

In this embodiment the normalization of input events is performed by the OS. The detection of user-level events, as well as optimization of rules of transformation of events, are defined in the application. This embodiment therefore provides a great flexibility to the developer of an application for defining, managing and optimizing user-level events.

Figure 4F:
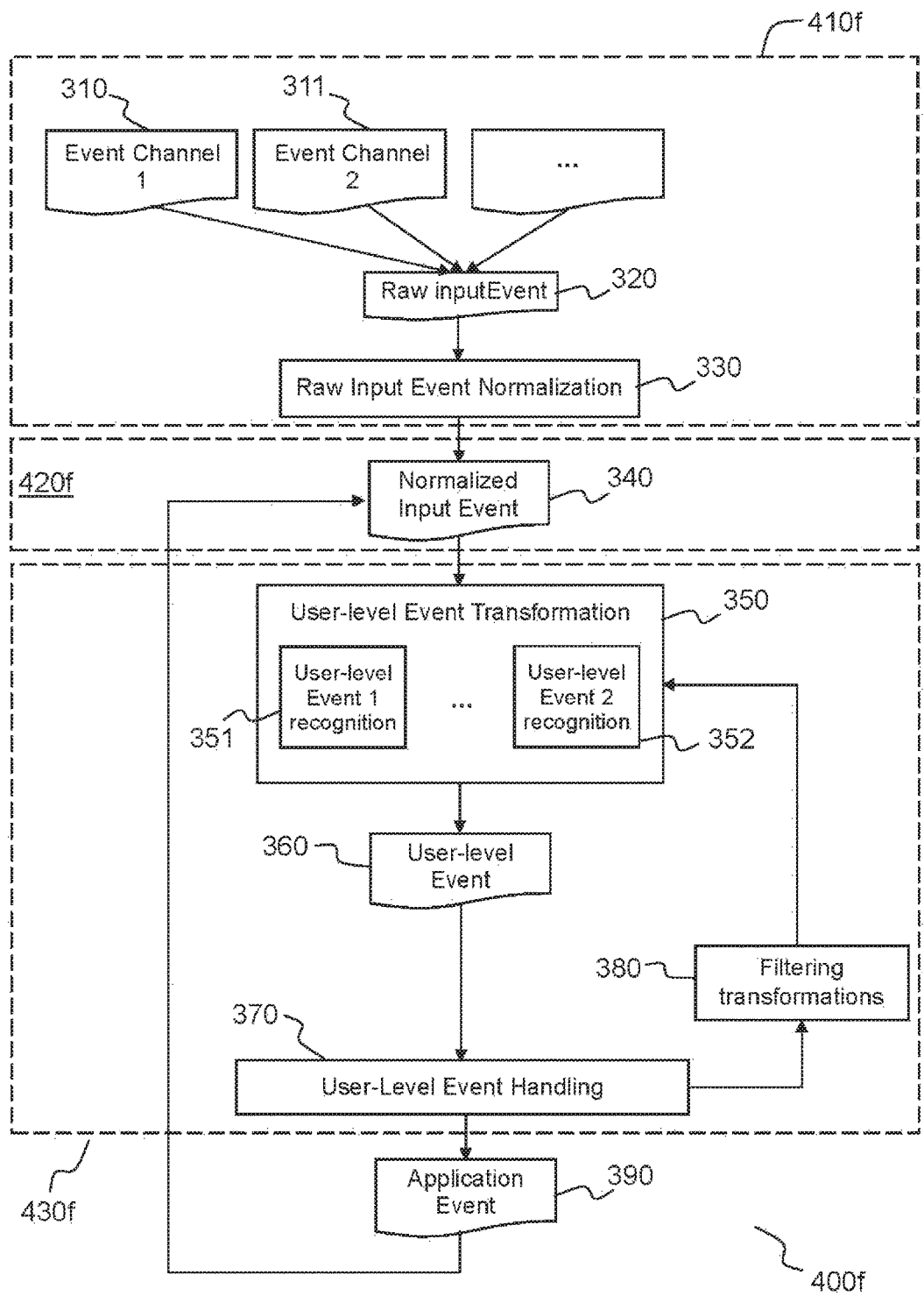

FIG. 4f displays a sixth functional architecture 400f for executing an application in a number of embodiments of the invention. The architecture 400f comprises the functional modules of the architecture 300. In the architecture 400f the raw input event normalization module 330 is a hardware module of the device 410f, the normalized input events are defined in the OS 420f of the device, the module 350 of user-level event transformation, and modules 370 and 380 of event handling and event detection optimization are software modules of the application 430f. The normalized input events are defined in the OS 420f. The hardware module of event normalization 330 converts input events from physical channels 310, 311 into events 340 normalized at OS level.

In this embodiment the normalization of input events is performed by the OS. The detection of user-level events, as well as optimization of rules of transformation of events, are defined in the application. This embodiment therefore provides a great flexibility to the developer of an application for defining, managing and optimizing user-level events.

Figure 5:
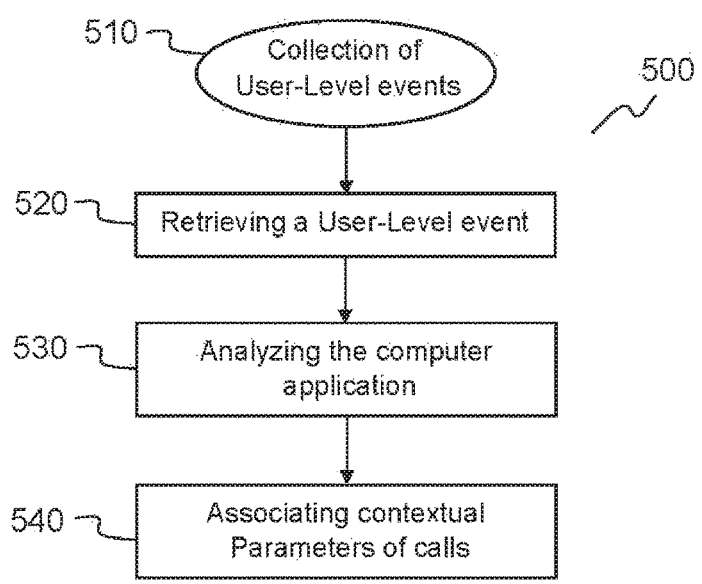
FIG. 5 displays a method for filtering a collection of user-level events in a number of embodiments of the invention.

FIG. 5 displays a method 500 for filtering a collection 510 of user-level events in a number of embodiments of the invention.

The expression "user-level events" in the expression, for collection 510 and filtering, refer to types of user-level events. The aim of method 500 is indeed to filter the types of user-level events that may be expected, in a given context, by the application. The method 500 can be used in a static analysis during the development of the application, and in a dynamic analysis at runtime. It aims at filtering the events the context of the application in which a user-level event may be fired and/or expected by the application. It may for example be embodied in a step 250 of configuration of a front-end of the application, or in a module 380 of optimization of event detection. In a number of embodiments of the invention, a list of all possible events of the application is generated statically, and this list is dynamically updated at runtime, by filtering the events that do not have a chance of occurring in a current context of the application.

The method 500 comprises a step 520 of retrieving a user-level event from the collection a user-level events. This method consists in retrieving the user-level event to filter. In an embodiment of the invention, the method is successively applied to each user-level event. In other embodiments of the invention, the method can be applied only to a subset of the collection of user-level events, for example the user-level events for which the transformation is known to be the most computer-intensive.

The method 500 further comprises a step 530 of analyzing the application to determine contextual parameters of calls of the user-level event in the computer application. This step may consist in identifying the successive function calls that lead to firing and/or waiting for the user-level event, and therefore the contexts of the application in which the user-level event can be fired and/or expected.

The method 500 further comprises a step 540 of associating the contextual parameters of at least the user-level event to the corresponding transformation. If the method is executed during the development of the application, metadata can be added within the executable code of the application and associated with the executable code of the transformation, in order to associate to the transformation the conditions in which it can occur. If the method is executed at runtime, information can be stored, in the memory area allocated to the applications, containing the contexts in which the user-level event can be fired and/or wait for. In a number of embodiments of the invention, such data is stored in metadata, XML or JSON files, or more generally in value pairs. For example, value pairs comprising the name of the transformation and the list of events needed for generating the events can be stored.

Figure 6:
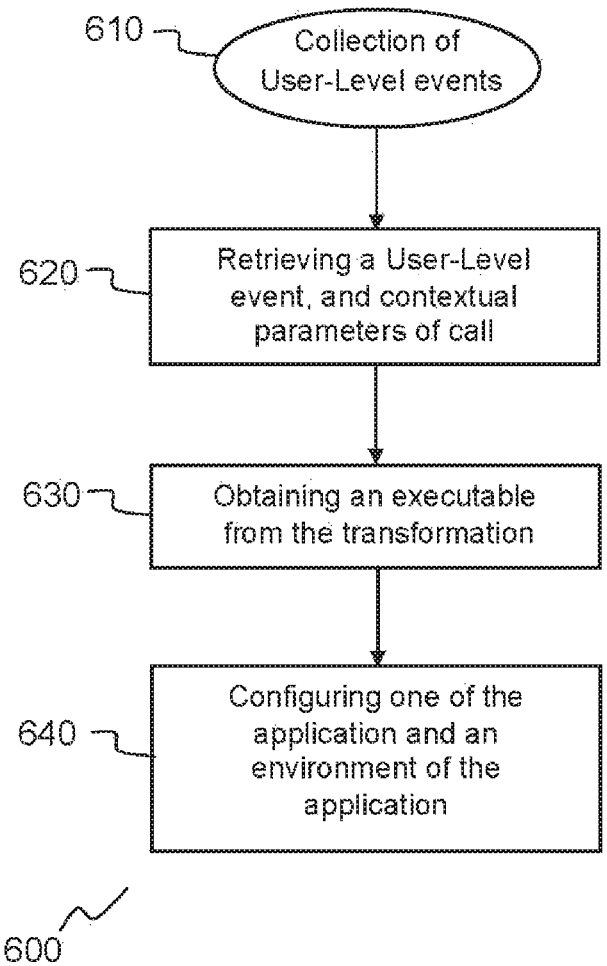
FIG. 6 displays a method for using a collection of user-level event in a number of embodiments of the invention.

FIG. 6 displays a method 600 for using a collection 610 of user-level events in a number of embodiments of the invention.

The method 600 can be used for the development, the compilation of an application, or at runtime. It uses contextual parameters that may have been generated by a method 500 for filtering a collection of user-level events. The expression "user-level events" in the expression, Collection of User-Level events 610, refer to user-level events which are filtered based on their type. The aim of method 600 is indeed to use only the types of user-level events that may be expected, in a given context, by the application.

The method comprises a step 620 of retrieving from the collection of user-level events, a corresponding user-level event and a transformation of a sequence of input events into the corresponding user-level event, said transformation having associated therewith contextual parameters of the calls of the user-level event to the corresponding transformation. This step typically consists in retrieving, for a user-level event, the contexts of the application in which it can be fired and/or expected. These contextual parameters may typically have been determined by a method 500, either during the development of the application, or at runtime.

The method 600 further comprises a step 630 of obtaining an executable form of the transformation, whenever the contextual parameters of said transformation define that said transformation should be called. Obtaining the executable form of the transformation may be done during the development of the application by generating said executable form, for example by compiling the corresponding source code. At runtime, it may be done by retrieving the memory address at which the executable form of the transformation can be called. The definition that transformation should be called can be performed according to various rules. In a number of embodiments of the invention, the transformation should be called if the corresponding user-level event is to wait for by the application. In another embodiment of the invention, the transformation should be called if the context of the application and the context of the environment of the application renders the generation of all input events used by the application possible.

The method 600 further comprises a step 640 of configuring at least one of the computer applications and an environment of the computer application for sending, to the transformation, series of bit patterns as sequences of input events expected as input to the at least a transformation.

This configuration may for example be performed by updating a list of active transformations, and executing a transformation when the corresponding sequence of input events occurs. In embodiments wherein the user-level events are generated by the application, the application may modify itself its context in order to execute only a subset of the transformations.

In other embodiments of the invention, user-level events are generated by the environment of the application, for example an operating system or a web browser. In these embodiments, user-level events may be used by a plurality of applications. Each application may indicate the events that it is waiting for in its context, and the environment of the application may update a list of transformation of user-level events that may be used by at least one application, and execute only the transformations in the list. In a number of embodiments of the invention, a correspondence between the transformations and the events necessary to execute the transformation are stored within metadata. It is then possible, knowing the events that can be generated in a given context, to filter the transformations that may be executed in said context.

The use of the method 600 is advantageous. Indeed, it allows the application or its environment to execute only the transformation that may generate an event that at least one application waits for, therefore saving CPU and rendering the execution of the application.

An application that executes the method 600 is remarkable in that the transformations of input events into user-level events that are executed depend on the context of the application. For example, if an application waits for a "double tap" event only in certain menus, the transformation of "tap" input events into "double tap" user events will be executed only when these menus are active: if the user performs a double tap and the menus are not active, the transformation will not be executed. This application can be executed within a device. Thus, this application will save CPU and battery on the device by not executing useless transformation that may be CPU-intensive. Meanwhile the application may be more reactive because the taps will be directly interpreted as single taps in this case.

In a number of embodiments of the application, the step 640 further comprises at least one of activating and deactivating input event channels relative to input events expected as inputs to the transformation. More specifically, this may consist in activating the event channels that correspond to input events that are expected by at least one active transformation, and deactivating other input event channels. As explained above, an input event channel can correspond to a type of input event, or a physical modality to receive a type of input event.

This embodiment is advantageous, since the deactivation of event channels further saves CPU and battery when executing the application. For example, if no active transformation is waiting for input events relative to the orientation of the device on which the application is running, it is possible to deactivate the corresponding channels, for example by powering off motion sensors. Similarly, it is possible to power off GPS, Wi-Fi, etc. . . . if the active transformations are not waiting for input events of that type. This embodiment is advantageous, because it can lead to important gains of power and battery, without prejudice to the functionalities of applications.

This functionality can be performed at different levels, and in different manners. For example, in the architectures 400a, and 400b, it can be performed, when activating or deactivating transformations, at the OS-level. In other embodiments of the invention, it can be performed in a web browser, or directly by the application. In some embodiments of the invention, the application constantly updates a collection of active transformation, and a collection of input event channels for all event that may be wait for by the application. At any time when a transformation is activated or deactivating, the relevant input channels may be activated or deactivated.

Figure 8A:
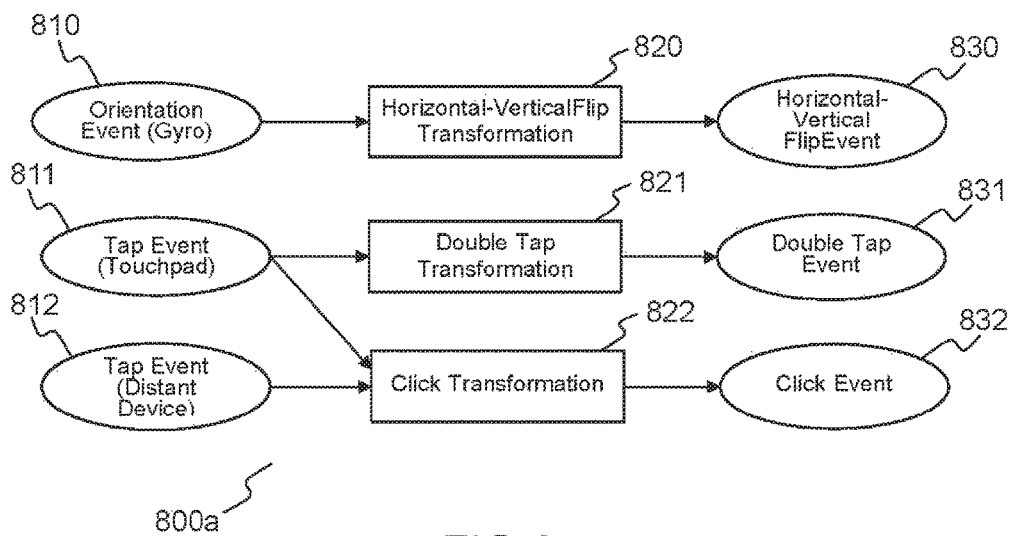
FIGS. 8a and 8b display two examples of activation and deactivation of transformations, and input event channels, in two different contexts of an application, in an embodiment of the invention
Figure 8B:
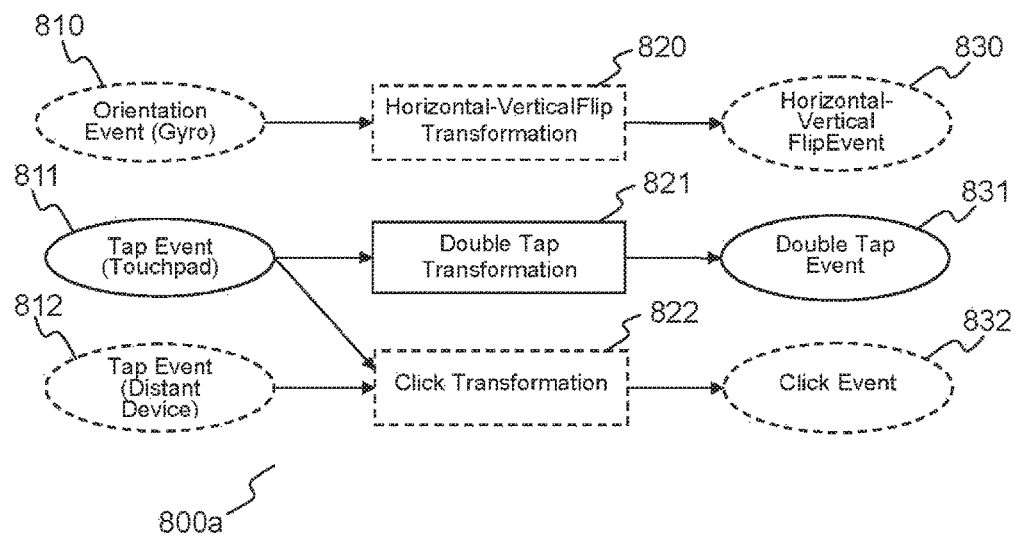

In other embodiments of the invention, the application keeps updated a collection of input event channels that it is waiting for, and the OS has an access to this collection. The OS is configured to activate and deactivate input event channels, based on the input events that the application, but also other applications or services running on the OS, are waiting for. FIGS. 8a and 8b provide examples of rules of activation or deactivation of input event channels.

A device in which the application is executed, or more generally a device configured for executing a method according to the invention comprises a processing capability. As non-limitative examples of embodiments of the invention the processing capability may an integrated circuit, for example a Central Processing Unit (CPU) that may be derived from the Von Neumann architecture, the Harvard architecture or the Modified Harvard Architecture, a microprocessor, for example an Application-Specific Integrated Circuit (ASIC), an Application-Specific Instruction-set Processor (ASIP), or a Graphics Processing Unit (GPU), a Multi-Core Processor, or a combination thereof.

Figure 7:
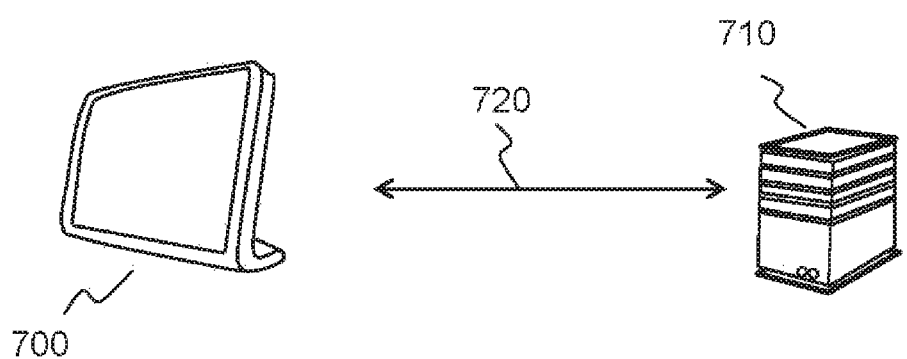
FIG. 7 displays an example of a device in communication with a server in a number of embodiments of the invention.

FIG. 7 displays an example of a device 700 in communication with a server 710 in a number of embodiments of the invention.

In these embodiments the filtering of the active transforms is performed by the server.

The device comprises at least two different channels of input events. It also comprises a communication channel 720 to a server 710. The communication link may comprise an internet connection between the device and the server. The device may for example be connected on the internet through a 3G or Wi-Fi connection. The device further comprises a processing capability.

The processing capability is configured for retrieving a context of the application, and sending the context of the application to the server through the communication channel, then receive from the server a transformation of a sequence of input event into a corresponding user-level event. In these embodiments of the invention the full collection of user-level event, and the corresponding transformations may be stored on the server rather than on the device.

The processing capability is further configured for obtaining an executable form of the transformation. It may obtain it by receiving it directly from the server. The executable forms of the transformation may also be stored on the device. The server then sends a reference to a transformation, and the processing capability is configured for localizing the executable form of the transformation on the device.

The processing capability is further configured for configuring at least one of the computer application and an environment of the computer application for sending, to the transformation, series of bit patterns as sequences of input events expected as input to the at least a transformation.

This embodiment advantageously permits update the rules of filtering the transformations directly on the server. In a number of embodiments of the invention, the servers comprise the contextual calls of the events, and is thus able to determine the contexts of the application in which the different transformations shall be executed.

FIGS. 8a and 8b display two examples of activation and deactivation of transformations, and input event channels, in two different contexts of an application, in an embodiment of the invention.

The application uses input event of three different modalities: input events 810 of the type "Orientation Event" from a gyro: input events 811 of the type "Tap Event" from the touchpad, and input events 812 of the type "Tap Event" from a distant device. Thus, when the modality 810 is active, input events of the type "Orientation Event" are fired upon the reception of signals from the gyro. Input events of the type "Orientation Event" comprise for example parameters relative to the angle of orientation of the device. When the modality 811 is active, input events of the type "Tap Event" are fired when the touchpad is pressed. Input events of this type comprise for example two parameters x,y which correspond to the position of a cursor at the type wherein the touchpad is pressed. When the modality 812 is active, input events of the type "Tap Event" are fired when a click is performed on a distant device in connection with the device. In this case, the values of the parameters x,y correspond to the position of the cursor at the time the click is performed on the distant machine.

The application executes three different transformations: a Horizontal-Vertical Flip Transformation 820, a Double Tap transformation 821, and a Click Transformation 822.

The Horizontal-Vertical Flip Transformation 820 fires a Horizontal-Vertical Flip event 830, upon the occurrence of Orientation events 810, when the values of orientation define that the device flipped from a horizontal to a vertical position, or from a vertical to a horizontal position.

The Double Tap Transformation 821 fires a Double Tap event 831, at the occurrence of two successive Tap Events, in a short period of time and at close position. However, the Double Tap transformation 821 is configured to be executed only at the occurrence of Tap Events of the modality 811, that is to say tap events from the touchpad.

The Click Transformation 822 fires a Click Event 832 upon the occurrence of a Tap Event, either from the Touch Pad (modality 811), or from the Distant Device (812).

The activation and deactivation of transformation, is for example performed by the step 640 of the method 600.

In the context 8a, the three user-level event types 830, 831, 832 are expected to be an input for the application. Meanwhile, in the context 800b, only the Double Tap Event 831 is expected to be an input for the application. The contextual parameters of call have previously been associated to the transformations, for example using the method 500. Thus, when switching for example from the context 800a to the context 800b, one of the application or an environment of execution of the application detects that the Horizontal-Vertical Flip Transformation 820, and the Click transformation 822 no longer fires events that are expected as input for the application.

Thus, in the context 800b, the application only executes the Double Tap transformation 821, and saves CPU power, and battery on the device. In a number of embodiments of the invention, At step 640 the method can further detect the input events modalities that are expected, in a given context, by the transformations. Input events of the Orientation Event modality 810 is expected only by the Horizontal-Vertical Flip Transformation 820. Thus input events from the Orientation Event modality are not expected in the context 800b, and the modality 810 can be deactivated. This further saves CPU power and battery, since the gyro can then be powered off, and operation of the gyro is very expensive, in terms of energy consumption.

Input events of the Tap Events from Distant device modality 812 are expected only by the Click Transformation 822. Thus input events from the Tap Event (Distant device) modality are not expected in the context 800b, and the modality 812 can be deactivated. This further saves CPU power and battery, since the it is possible to deactivate the communication channel to the distant device. If the communication channel to the distant device uses a communication link which is not used by any other application, it is possible to power off this link, for example power off the Wi-Fi, and thus further save CPU power or battery.

Input events of the Tap Events from the Touchpad modality 811 are expected by both the Double Tap Transformation 821, and the Click Transformation 822. The Double Tap transformation 821 remains active in the context 800b. Thus, the modality 811 shall not be deactivated, in order for the application to run successfully.

This example demonstrates the ability of the invention to execute and run only the transformations necessary to make the application run successfully, while limiting the consumption of CPU power and battery of the device on which the application runs.

The examples described above are given as illustrations of embodiments of the invention. They do not in any way limit the scope of the invention which is defined by the following claims.

The invention claimed is:

1. A method for using a collection of user-level events, said method comprising for each application event to be entered in a computer application:

retrieving from the collection of user-level events, a corresponding user-level event and a transformation of a sequence of input events into the corresponding user-level event, said transformation having associated therewith the contexts of the computer application in which the corresponding user-level event can be fired and/or wait for;

and only if a context of the computer application belongs to the contexts associated to the transformation:

obtaining an executable form of the transformation, whenever the contextual parameters of said transformation define that said transformation should be called;

configuring at least one of the application and an environment of the application for sending, to the transformation, a series of bit patterns as sequences of input events expected as inputs to the transformation;

wherein obtaining an executable form of the transformation comprises compiling a source code corresponding to the transformation, in order to generate said executable form.

2. The method of claim 1, wherein configuring at least one of the application and an environment of the application for sending, to the transformation, a series of bit patterns as sequences of input events expected as inputs to the transformation comprises at least one of activating and deactivating input event channels relative to input events expected as inputs to the transformation.

3. The method of claim 2, wherein activating and deactivating input event channels relative to input events expected as inputs to the transformation comprises:

obtaining a collection of transformations comprising, in a context of execution of the computer application, the transformations that should be called;

obtaining a collection of input event channels comprising input events channels relative to input events expected as inputs to at least one transformation in the collection of transformations;

at least one of activating an input event channel which is in the collection of input event channels, or deactivating an input event channel which is not in the collection of input event channels.

4. A device equipped with at least a processing capability configured for executing the steps of a method according to claim 1.

5. An application, stored on a non-transitory medium, comprising code instructions for causing a processor to execute the steps of a method according to claim 1.

6. The method of claim 1, comprising updating a list of active transformations, and executing an active transformation when the corresponding sequence of input events occurs.

7. The method of claim 1, wherein:

the environment of the application is configured to execute a plurality of applications expecting said user-level events as input, said plurality of applications comprising said computer application;

each application of said plurality indicates to the environment the user-level events it is waiting for in its current context;

the environment updates a list of active transformations of sequences of input events into user-level events that are wait for at least one application;

the environment is configured to executing an active transformation when the corresponding sequence of input events occurs.

8. The method of one of claim 1, wherein the contexts of the computer application in which the corresponding user-level event can be fired and/or wait for is stored within metadata associated with the transformation.

9. A method for using a collection of user-level events, said method comprising for each application event to be entered in a computer application:

retrieving from the collection of user-level events, a corresponding user-level event and a transformation of a sequence of input events into the corresponding user-level event, said transformation having associated therewith the contexts of the computer application in which the corresponding user-level event can be fired and/or wait for;

and only if a context of the computer application belongs to the contexts associated to the transformation:

obtaining an executable form of the transformation, whenever the contextual parameters of said transformation define that said transformation should be called;

configuring at least one of the application and an environment of the application for sending, to the transformation, a series of bit patterns as sequences of input events expected as inputs to the transformation; and wherein obtaining an executable form of the transformation comprises, at runtime, retrieving the memory address at which the executable form can be called.

10. The method of claim 9, wherein configuring at least one of the application and an environment of the application for sending, to the transformation, a series of bit patterns as sequences of input events expected as inputs to the transformation comprises at least one of activating and deactivating input event channels relative to input events expected as inputs to the transformation.

11. The method of claim 9, wherein activating and deactivating input event channels relative to input events expected as inputs to the transformation comprises:

obtaining a collection of transformations comprising, in a context of execution of the computer application, the transformations that should be called;

obtaining a collection of input event channels comprising input events channels relative to input events expected as inputs to at least one transformation in the collection of transformations;

at least one of activating an input event channel which is in the collection of input event channels, or deactivating an input event channel which is not in the collection of input event channels.

12. A device equipped with at least a processing capability configured for executing the steps of a method according to claim 9.

13. An application, stored on a non-transitory medium, comprising code instructions for causing a processor to execute the steps of a method according to claim 9.

14. The method of claim 9, comprising updating a list of active transformations, and executing an active transformation when the corresponding sequence of input events occurs.

15. The method of claim 9, wherein:

the environment of the application is configured to execute a plurality of applications expecting said user-level events as input, said plurality of applications comprising said computer application;

each application of said plurality indicates to the environment the user-level events it is waiting for in its current context;

the environment updates a list of active transformations of sequences of input events into user-level events that are wait for at least one application; and the environment is configured to executing an active transformation when the corresponding sequence of input events occurs.

16. The method of claim 9, wherein the contexts of the computer application in which the corresponding user-level event can be fired and/or wait for is stored within metadata associated with the transformation.

* * * * *